United States Patent
Kreindl et al.

(10) Patent No.: US 9,082,059 B2
(45) Date of Patent: Jul. 14, 2015

(54) METHOD AND DEVICE FOR PRODUCING INDIVIDUALLY CODED READ PATTERNS

(75) Inventors: Gerald Kreindl, Schärding (AT); Thomas Glinsner, St. Florian (AT)

(73) Assignee: EV Group E. Thallner GmbH, St. Florian am Inn (AT)

( * ) Notice: Subject to any disclaimer, the term of this patent is extended or adjusted under 35 U.S.C. 154(b) by 0 days.

(21) Appl. No.: 13/981,616

(22) PCT Filed: Dec. 12, 2011

(86) PCT No.: PCT/EP2011/072476
§ 371 (c)(1), (2), (4) Date: Jul. 25, 2013

(87) PCT Pub. No.: WO2013/087089
PCT Pub. Date: Jun. 20, 2013

(65) Prior Publication Data
US 2013/0306742 A1    Nov. 21, 2013

(51) Int. Cl.
*G06K 19/077* (2006.01)
*G06K 19/067* (2006.01)

(52) U.S. Cl.
CPC ...... *G06K 19/07749* (2013.01); *G06K 19/0672* (2013.01)

(58) Field of Classification Search
USPC .................. 235/492, 488; 156/345.1; 216/13
See application file for complete search history.

(56) References Cited

U.S. PATENT DOCUMENTS

| | | | |
|---|---|---|---|
| 7,012,270 B2 * | 3/2006 | Xu et al. | 250/548 |
| 2004/0029258 A1 * | 2/2004 | Heaney et al. | 435/287.2 |
| 2005/0022888 A1 * | 2/2005 | Samper et al. | 137/828 |
| 2008/0188037 A1 * | 8/2008 | Lin | 438/108 |
| 2009/0100392 A1 * | 4/2009 | Ivaldi | 716/5 |
| 2010/0119971 A1 * | 5/2010 | Kim et al. | 430/270.1 |
| 2010/0181379 A1 * | 7/2010 | Okegawa et al. | 235/488 |
| 2010/0269319 A1 | 10/2010 | Omura et al. | 29/25.35 |
| 2011/0045409 A1 * | 2/2011 | Fujimura | 430/296 |
| 2012/0156593 A1 * | 6/2012 | Hsieh et al. | 430/5 |
| 2012/0244461 A1 * | 9/2012 | Nagai | 430/30 |
| 2013/0094035 A1 * | 4/2013 | Chang et al. | 358/1.9 |

FOREIGN PATENT DOCUMENTS

| | | | |
|---|---|---|---|
| JP | 2003-271912 | 9/2003 | G06K 19/07 |
| JP | 2007-281708 | 10/2007 | H03H 3/08 |

OTHER PUBLICATIONS

International Search Report for International Application No. PCT/EP2011/072476, Sep. 5, 2012.
Office Action issued in connection with corresponding Japanese Application No. JP 2014-501456, Nov. 10, 2014.

* cited by examiner

*Primary Examiner* — Allyson Trail
(74) *Attorney, Agent, or Firm* — Kusner & Jaffe

(57) ABSTRACT

A device for producing individually coded read patterns, especially resonators for use in RFID chips. The device includes a structuring apparatus for producing a basic pattern with at least one group of individual patterns on a carrier substrate, and a processing apparatus for forming at least one individually coded read pattern flat a time with read elements from a subset of a total set of the individual patterns of each group. The invention also relates to a corresponding method and a read structure, produced according to the described method and/or the described device.

31 Claims, 2 Drawing Sheets

METHOD AND DEVICE FOR PRODUCING INDIVIDUALLY CODED READ PATTERNS

FIELD OF THE INVENTION

This invention relates to a device for producing individually coded read patterns, a corresponding method, as well as a read pattern produced by the method. The read patterns as claimed in the invention are used especially as components of RFID chips.

BACKGROUND OF THE INVENTION

RFID components are becoming more and more important. The advantage of RFID components in contrast to the still common bar codes is that they can be read out electronically without direct visual contact and can be connected to more and more complex modules in an increasingly extremely cost-effective manner. Thus for example the first RFID components were simple transponders which delivered a response signal to an incoming signal. Currently development is proceeding in the direction of RFID components which can be operated without a power supply only by the induction of the electromagnetic radiation of a high frequency signal even together with other functional modules. Mainly memory modules which can be programmed and read out should be mentioned here. Modern RFID components have a coil, preferably a flat coil, a rectifier for converting the AC signal into DC, as well as the aforementioned functional modules.

In the early years the RFID technology was already being used in industry to mark goods in a production chain. A semifinished product received an RFID "label" and could be tracked, registered and monitored up to final installation within a factory. Furthermore RFID technology was also introduced into retail chains in which goods were protected against theft by RFID. Due to increasing miniaturization these components are not only being provided with more functions, but also are becoming increasingly smaller and at the same time cheaper.

One of the main problems is the "coding" of the so-called code reflectors (resonators). Each RFID component has its own "number" (coding) which can be read out. The number is not present as software in a memory which must be read out, but is physically coded in a code reflector. The incoming electromagnetic "read wave" in a (flat) coil induces a current which feeds the RFID circuit. The resonator "returns" as the response signal a coded analog and/or digital signal which is emitted via an antenna. The resonators, in primitive terms, consist of line patterns. By providing line patterns at certain locations the resonant frequencies can be set. The problem is that several RFID chips or resonators are produced on one wafer in order to be able to economically produce a plurality of resonators. Of course each of the RFID chips must have its own "identification", therefore its own and mainly unique code. Of course a mask could be produced which justifies this circumstance by there being simply a corresponding pattern in the mask at each chip position. However the cost of preparing one mask per wafer is disproportionate. Since to date there has been no possibility of producing "dynamically variable masks", the production process of the resonators must take place separately from the other structures of the chip.

Until today, to produce resonators lithographic methods have been used in which the line patterns are produced individually. Technical problems are posed by the resolution which constitutes a limiting factor due to the ratio of the wavelength to the aperture. The smaller the patterns, the smaller the wavelengths must also be, and the more complicated the lithographic systems must be; this leads to a corresponding cost explosion.

SUMMARY OF THE INVENTION

The object of this invention is therefore to simplify the production of individually coded read patterns and thus to make available more economical RFID chips.

This object is achieved with the features of the independent claim(s). Advantageous developments of the invention are given in the dependent claims. All combinations of at least two of the features given in the specification, the claims and/or the figures also fall within the scope of the invention. At the given value ranges, values within the indicated limits will also be considered to be disclosed as boundary values and will be claimed in any combination.

The main idea of this invention is first of all to form an especially uniform basic pattern which is easy to produce on a carrier substrate and then on the foundation of this basic pattern to form an individually coded read pattern by processing of the basic pattern. Thus, for producing the basic pattern standard methods can be used so that in spite of providing several steps up to production of the read pattern, production is enabled which is more economical compared to the prior art.

An independent invention is therefore a device for producing individually coded read patterns, especially resonators, with the following features:
- a structuring apparatus, especially in the form of a lithography system, for producing a basic pattern with at least one group of individual patterns on a carrier substrate and
- a processing apparatus which consists of several apparatus for forming at least one individually coded read pattern at a time with read elements from a selected or selectable subset of a total set of the individual patterns of each group.

According to one advantageous embodiment of the invention it is provided that the processing apparatus has application means for at least partial covering of an unselected remaining number of the total number of individual patterns of each group with a fluid, especially a polymer. Thus the formation of read elements or a read pattern on the covered individual patterns can be prevented by controlled triggering of the application means. This leads to a significant simplification and more economical production of the read patterns.

To the extent the application means have at least one dispenser which has a nozzle, especially a nanodispenser, exact and prompt metering of even extremely small amounts of fluid is possible.

Advantageously it is furthermore provided that the structuring apparatus, especially as an embossing apparatus, is made to produce the individual patterns in alternation as depressions and especially elevations which have been formed by formation of the depressions. The individual patterns can be especially economically produced in this way with extremely small dimensions.

By the device being set up in an advantageous configuration such that each read element is made on one individual pattern at a time, especially exclusively on one depression at a time, the covering of the respective unselected individual pattern can be especially easily and reliably implemented.

Moreover as claimed in the invention it is conceivable that the processing apparatus has reducing agents which act especially by etching, for especially uniform reduction of the thickness $D_1$ of the basic pattern, especially at least by one height h of the depressions (of the carrier substrate). Thus the surface of the depressions after reduction/stripping is formed by the carrier substrate so that material which is then introduced in the depressions for the formation of the read pattern can be joined directly to the carrier substrate.

In another advantageous embodiment of the invention it can be provided that the processing apparatus has coating means for especially blanket coating, especially deposition, of a coating material which at least partially forms the read pattern, on the groups or the basic pattern. The coating material can be easily applied in this way over the entire surface, unselected individual patterns being impeded from coating by the covering with the fluid. The unselected individual patterns are thus not coated.

Advantageously the processing apparatus has means for especially complete dissolution of the basic pattern which has been reduced especially by the reducing agents from the carrier substrate. Thus, the coating which had been applied in the selected individual patterns, especially depressions, now remains on the carrier substrate so that an individual read pattern results from the selected individual patterns and moreover allows clear delineation between the individual read elements and can be made especially thin.

An independent invention is a method for producing individually coded read patterns, especially resonators, with the following steps, especially the following sequence:

producing a basic structure with at least one group of individual patterns on a carrier substrate by means of a structuring apparatus and forming at least one individually coded read pattern with read elements from a selected or selectable subset of a total set of individual patterns of each group.

Insofar as features relating to the device have been described, they should also be considered disclosed as features relating to the method.

Furthermore this invention relates to a read pattern which has been produced by the described device and the described method.

The invention relates not only to the production of RFID resonators, but in general to the production of individually coded mechanical-electronic binary patterns. The RFIDs are one preferred embodiment or preferred use of the invention. One alternative use of the invention as claimed in the invention would be the production of mechanical-electronic patterns which provide devices with a serial number in order to uniquely identify them. These serial numbers are stored mainly electronically in the prior art, especially permanently in flash memories, or semipermanently. These memories can however be manipulated, replaced or altered. Thus the embodiment as claimed in the invention allows the production of individually codable patterns in a mass production process. The use of these patterns can be diverse, as shown using some preferred embodiments.

BRIEF DESCRIPTION OF THE DRAWINGS

Other advantages, features and details of the invention will become apparent from the following description of the figures. The figures are schematic and highly enlarged.

In the figures, advantages and features of the invention are labeled with these reference numbers which identify them according to embodiments of the invention, components or features with the same function or function with the same effect being labeled with identical reference numbers.

DETAILED DESCRIPTION OF THE INVENTION

The figures show the features as claimed in the invention not to scale, in order to be able to represent the function of the individual features at all. The ratios of the individual components can be disproportionate; this can be attributed to the individual patterns $4e$, $4v$ which are shown highly enlarged.

Figure 1:
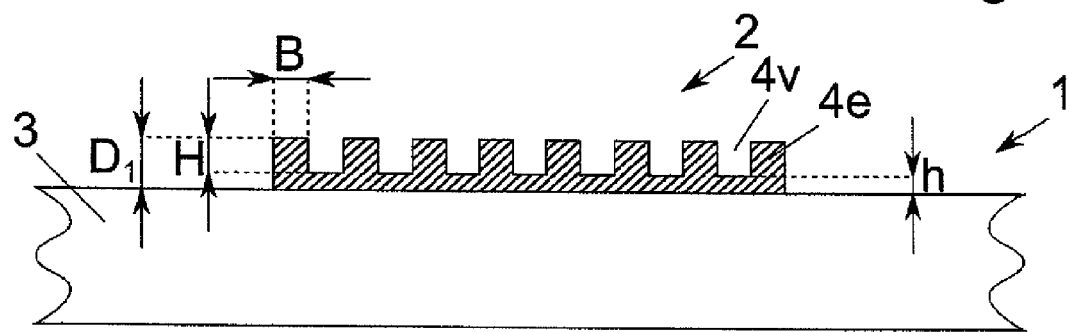
FIG. 1 shows a cross sectional view of a carrier substrate by way of extract, with a basic pattern.

FIG. 1 shows a carrier substrate 3, especially in the form of a wafer, by way of extract, specifically an extract with a group 2.1 of individual patterns $4v$, $4e$ at least temporarily fixed on a surface $3o$ of the carrier substrate. On the carrier substrate 3 there is a plurality of groups 2.1 to $2.n$ which jointly form a basic pattern 2. The latter can also be applied as a continuous basic pattern 2, especially by nanoimprinting, so that the groups 2.1 to $2.n$ at first cannot be visibly distinguished, but are separated only by later separation/partitioning.

The basic pattern 2 consists of the individual patterns, which in turn consist of depressions $4v$ and elevations $4e$ which are formed by the formation of depressions $4v$. The basic pattern 2 has an average thickness $D_1$ which is as uniform as possible. The depressions $4v$ extend over a height h from the carrier substrate 3. The elevations $4e$ rise above the depressions $4v$ by a height H and the depressions have an especially uniform width B. The elevations $4e$ can have different lengths in depth, and can be made especially as strips.

Figure 2:
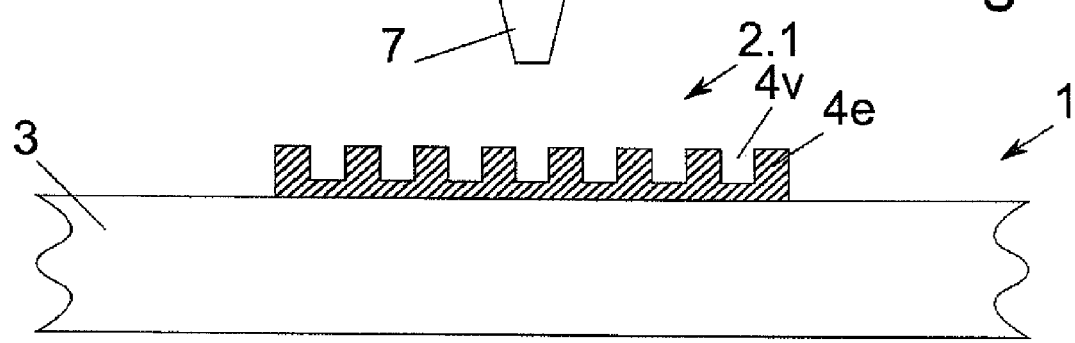
FIG. 2 shows a schematic of application means which can be aligned and which is located above the basic pattern.
Figure 3:
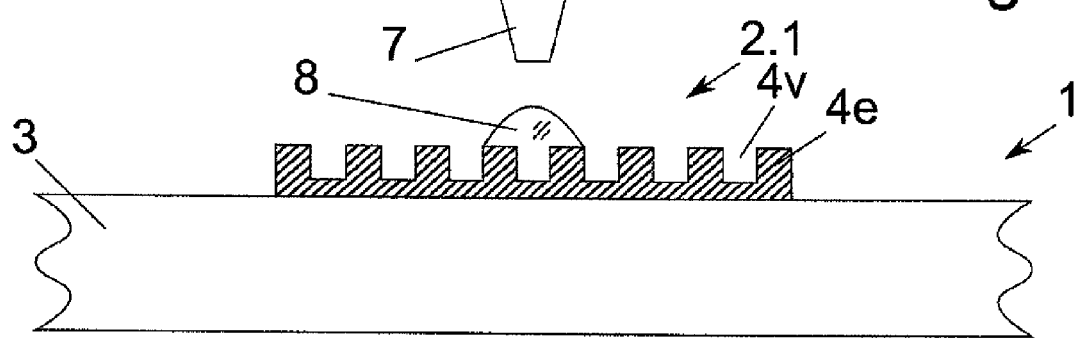
FIG. 3 shows the application of a fluid to the basic pattern.

In FIG. 2 an application means 6 in the form of a nanodispenser system for applying a fluid 8 via at least one nozzle 7 can be located opposite the basic pattern 2. Application takes place both locally and also quantitatively exactly controlled, especially by a central control apparatus.

The application means 6 in one special embodiment has several nozzles 7, therefore a type of nozzle array of several nozzles 7. The nozzles 7 can advantageously be triggered individually and can thus deposit several droplets at the same time. The distance between the nozzles is especially identical to the distance between the depressions $4v$, preferably it can be set individually, especially controlled by a central control apparatus.

To form individually coded read patterns 11 (see FIG. 6) depressions $4v$ which have not been selected by the application means are covered with a fluid, especially applied in droplet form. The fluid 8 is a polymer, the volume of the applied fluid being less than 100 µl, especially less than 100 nl, even more preferably less than 10 nl, preferably less than 1 nl. A plurality of droplets is applied on corresponding unselected depressions $4v$. The distribution of the unselected depressions later yields an individual read pattern 11. The selection can be especially randomly controlled.

The droplets are applied especially along the entire basic pattern 2, therefore for a plurality of groups 2.1 to $2.n$, for each group 2.1 to $2.n$ there being a different pattern for droplet application.

Figure 4:
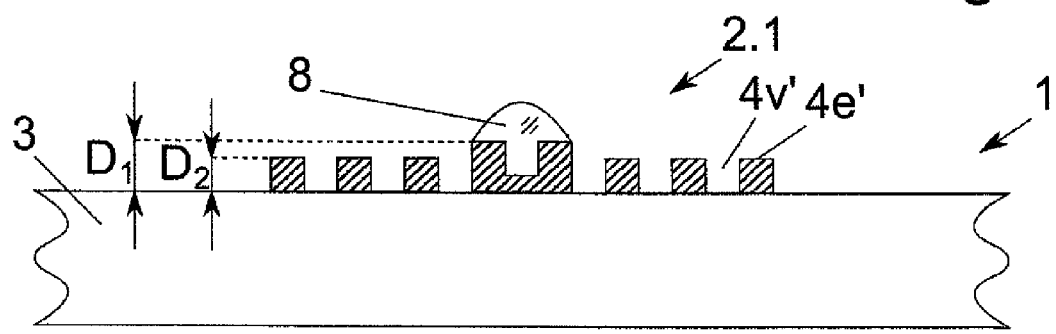
FIG. 4 shows a step of reducing/stripping of the thickness $D_1$ of the basic pattern.

In the method step which is shown in FIG. 4, a part of the exposed outer contour of the basic pattern 2, is stripped by reducing agents, especially uniformly on the entire exposed surface of the outer contour, especially by etching methods, preferably using a fluid etchant.

The thickness $D_1$ of the basic pattern 2 is stripped at least by the height h of the depressions $4v$ so that at least the uncovered individual patterns, especially elevations $4e$, have a new, especially essentially uniform thickness $D_2$. Thus the selected individual patterns are formed by reduced elevations 4e' and especially completely reduced depressions 4v' whose bottom is formed especially completely by the carrier substrate 3.

Figure 5:
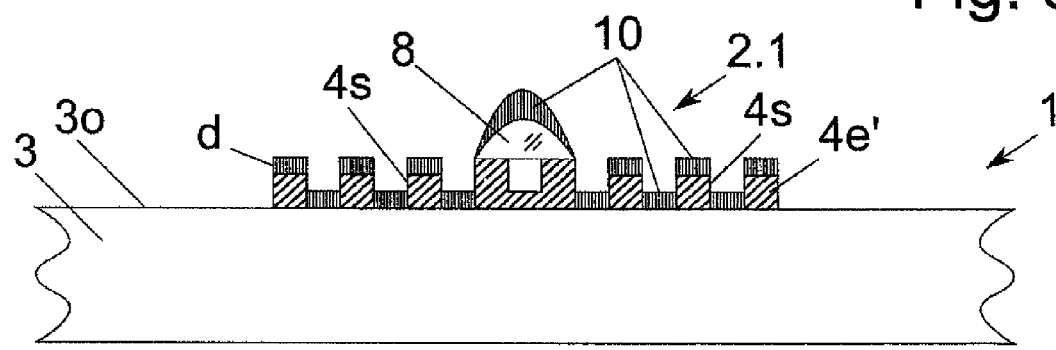
FIG. 5 shows a step of coating of the basic pattern.

In the subsequent method step according to FIG. 5 the basic pattern 2 is coated with a coating material 10, especially completely (therefore all groups 2.1 to 2.n), therefore both the selected and also the unselected individual patterns, by coating means (deposition means). The coating material 10 is preferably a metal. The coating takes place from a direction perpendicular to the surface 3o of the carrier substrate 3 on which the basic pattern 2 is located. Thus surfaces which are perpendicular (or essentially perpendicular) to the surface 3o, specifically especially side walls 4s of the individual patterns (which at the same time form the depressions 4v, 4v') are not coated or are coated at least negligibly with the coating material 10. The more dramatically one surface is tilted relative to the surface 3o, the less coating material 10 is applied there. This can be recognized especially well on the droplet-shaped coating of the fluid 8 which becomes thinner and thinner towards the edge which is dropping off more and more steeply. The amount of the coating is such that a thickness d of the coating is smaller than the thickness D2 and/or smaller than the height H of the elevations 4e' (optionally reduced height H'). Thus the side walls 4s are at least partially exposed.

Figure 6:
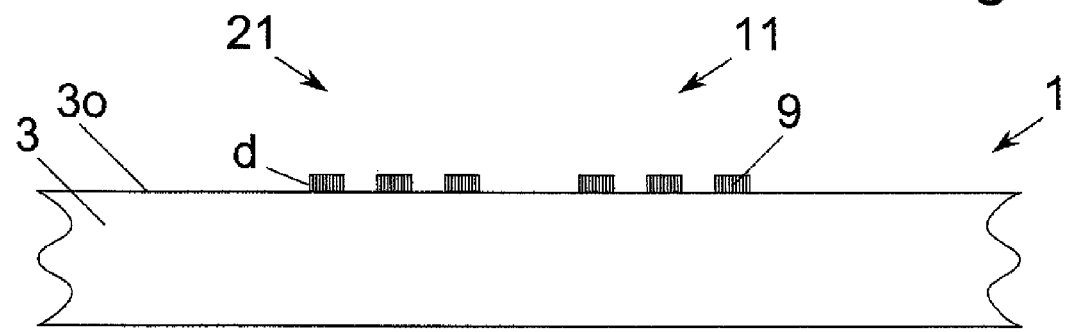
FIG. 6 shows a step of dissolving the basic pattern.

As shown in FIG. 6, the basic pattern 2 is stripped by dissolving agents (here by a stripping method) so that only the part of the coating material 10 applied directly on the surface 3o of the carrier substrate 3 remains on the carrier substrate 3 since it is connected to the surface 3o by the coating and not, like the other partial amount of the coating material 10, detached/stripped/removed with the basic pattern 2 or the fluid 8. The detachment takes place preferably by chemical processes, especially when the coating material 10 is a photoresist. The means for dissolving the basic pattern selectively dissolve the basic pattern 2 and preferably do not attack the coating material 10.

The coating material 10 which remains on the surface 3o corresponds to the shape according to the selected depressions 4v and this part of the coating material 10 forms the read elements 9.

The read elements 9 are coded differently in each group 2.1 to 2.n and can be used as a resonator for RFID chips. Each group 2.1 to 2.n of read elements 9 thus forms a coded read pattern 11 with a small thickness d.

The groups 2.1 to 2.n with the respectively coded read structure 11 can be separated especially after a back-thinning process of the carrier substrate 3.

Thus, a plurality of differently coded read patterns 11 can be easily produced. Thus, on one carrier substrate 3 several 100 read patterns 11 with different coding can be produced, and for each new carrier substrate a new individual coding can be provided.

The basic patterns 2 and the read patterns 11 can be inspected by means of different measurement methods such as optical microscopy, scanning tunnel microscopy, scanning electron microscopy, AFM (atomic force microscopy) or MFM (magnetic force microscopy) etc., before the method as claimed in the invention, during or after the execution of the method as claimed in the invention.

REFERENCE NUMBER LIST 2 basic pattern
2.1 to 2.n groups
3 carrier substrate
3o surface
4v, 4v' depressions
4e, 4e' elevations
4s side walls
6 application means
7 nozzle
8 fluid
9 read elements
10 coating material
11 read pattern
D1 thickness
D2 thickness
d thickness
h height
H, H' height
B width Having described the invention, the following is claimed:

1. A device for producing an individually coded read pattern using two different apparatuses, said device comprising:
    a structuring apparatus for producing a basic pattern comprised of a plurality of raised structures that are spaced apart along a carrier substrate; and
    a processing apparatus including:
        a dispenser that dispenses a first material at predetermined locations along said plurality of raised structures; and
        a coating means for applying a second material on said carrier substrate, said plurality of raised structures and said first material wherein said second material disposed directly on said carrier substrate at least partially defines at least one read pattern with read elements, each read pattern being individually coded.

2. The device as claimed in claim 1, wherein the first material at least partially covers an unselected remaining number of the total number of patterns.

3. The device as claimed in claim 2, wherein the dispenser includes a nozzle.

4. The device as claimed in claim 2, wherein the first material is a polymer.

5. The device as claimed in claim 3, wherein the dispenser is a nanodispenser.

6. The device as claimed in claim 1, wherein the structuring apparatus includes an embossing apparatus for producing the patterns in alternation as depressions and elevations, said elevations formed by formation of the depressions.

7. The device as claimed in claim 1, wherein the processing apparatus is configured such that each read element is made on one individual pattern at a time.

8. The device as claimed in claim 7, wherein said processing apparatus is configured such that each read element is made exclusively on one depression at a time.

9. The device as claimed in claim 1, wherein the processing apparatus has reducing agents which act by etching for uniform reduction of the thickness ($D_1$) of the basic pattern.

10. The device as claimed in claim 1, wherein the second material is a coating material which at least partially forms the at least one read pattern.

11. The device as claimed in claim 1, wherein the processing apparatus has means for complete dissolution of the basic pattern, which has been reduced by reducing agents, from the carrier.

12. A method for producing an individually coded read pattern in a two step process, said method comprising:
    producing a basic pattern comprised of a plurality of raised structures that are spaced apart with at least one group of patterns on a carrier substrate by means of a structuring apparatus; and after the step of producing the basic pattern, forming at least one individually coded read pattern with read elements from a selected or selectable subset of a total set of patterns of each group by means of a processing apparatus, said processing apparatus including:
  a dispenser that dispenses a first material at predetermined locations along said plurality of raised structures, and
  a coating means for applying a second material on said carrier substrate, said plurality of raised structures and said first material wherein said second material disposed directly on said carrier substrate at least partially defines at least one individually coded read pattern.

13. The method as claimed in claim 12, wherein formation of the at least one individually coded read pattern comprises:
  at least partially covering an unselected residual number of the total number of patterns of each group with the first material.

14. The method as claimed in claim 13, wherein the first material is a polymer.

15. The method as claimed in claim 12, wherein formation of the at least one individually coded read pattern comprises:
  reduction of the thickness of the basic pattern by reducing agents,
  blanket coating by deposition of the second material to at least partially form the read pattern, and
  dissolution of the basic pattern from the carrier substrate.

16. The method as claimed in claim 12, wherein one read pattern at a time is formed from each group and each read pattern is coded differently.

17. The method as claimed in claim 12, wherein the patterns are produced by the structuring apparatus in alternation as depressions and elevations, said elevations formed by formation of the depressions.

18. The method as claimed in claim 17, wherein said elevations are formed by imprint lithography.

19. The method as claimed in claim 12, wherein each read element is formed on one individual pattern at a time.

20. The method as claimed in claim 19, wherein each read element is formed on one pattern exclusively on one depression at a time.

21. A read pattern for a resonator of an RFID chip, the read pattern produced according to a method comprising:
  producing a basic pattern comprised of a plurality of raised structures that are spaced apart with at least one group of patterns on a carrier substrate by means of a structuring apparatus; and
  forming at least one individually coded read pattern for the resonator with read elements from a selected or selectable subset of a total set of patterns of each group.

22. A read pattern for a resonator of an RFID chip, the read pattern produced according to a device comprising:
  a structuring apparatus for producing a basic pattern comprised of a plurality of raised structures that are spaced apart with at least one group of patterns on a carrier substrate; and
  a processing apparatus for forming from a subset of a total set of the patterns of each group at least one read pattern with read elements, each read pattern being individually coded and corresponding to one resonator for an RFID chip, said processing apparatus including:
    a dispenser that dispenses a first material at predetermined locations along said plurality of raised structures, and
    a coating means for applying a second material on said carrier substrate, said plurality of raised structures and said first material wherein said second material' disposed directly on said carrier substrate at least partially defines at least one individually coded read pattern.

23. A device for producing individually coded read patterns, said device comprising:
  a structuring apparatus for producing a basic pattern comprised of a plurality of raised structures that are spaced apart with at least one group of patterns on a carrier substrate; and
  a processing apparatus for forming from a subset of a total set of the patterns of each group at least one read pattern with read elements, each read pattern being individually coded, the processing apparatus including:
    a dispenser that dispenses a first material at predetermined locations along said plurality of raised structures, and
    a coating means for applying a second material on said carrier substrate, said plurality of raised structures and said first material wherein said second material disposed directly on said carrier substrate at least partially defines at least one individually coded read pattern.

24. The device as claimed in claim 23, said dispenser includes a nozzle.

25. The device as claimed in claim 23, said processing apparatus has reducing agents which act by etching for uniform reduction of the thickness ($D_1$) of the basic pattern.

26. The device as claimed in claim 23, said processing apparatus has means for complete dissolution of the basic pattern, which has been reduced by reducing agents, from the carrier.

27. A device for producing individually coded read patterns, said device comprising:
  a structuring apparatus for producing a basic pattern comprised of a plurality of raised structures that are spaced apart with at least one group of patterns on a carrier substrate; and
  a processing apparatus for forming from a subset of a total set of the patterns of each group at least one read pattern with read elements, each read pattern being individually coded, wherein the processing apparatus is configured such that each read element is made on one individual pattern at a time, said processing apparatus including:
    a dispenser that dispenses a first material at predetermined locations along said plurality of raised structures, and
    a coating means for applying a second material on said carrier substrate, said plurality of raised structures and said first material wherein said second material disposed directly on said carrier substrate at least partially defines at least one individually coded read pattern.

28. A device for producing individually coded read patterns, said device comprising:
  a structuring apparatus for producing a basic pattern comprised of a plurality of raised structures that are spaced apart with at least one group of patterns on a carrier substrate; and
  a processing apparatus for forming from a subset of a total set of the patterns of each group at least one read pattern with read elements, each read pattern being individually coded, the processing apparatus including:
    coating means for blanket coating by deposition, of a coating material which at least partially forms the at least one read pattern, on the groups or the basic pattern.

29. A method for producing individually coded read patterns, said method comprising:
- producing a basic pattern comprised of a plurality of raised structures that are spaced apart with at least one group of patterns on a carrier substrate by means of a structuring apparatus; and
- forming at least one individually coded read pattern with read elements from a selected or selectable subset of a total set of patterns of each group, wherein forming the at least one individually coded read pattern includes:
  - reduction of the thickness of the basic pattern by reducing agents,
  - blanket coating by deposition of a coating material to at least partially form the read pattern, and
  - dissolution of the basic pattern from the carrier substrate.

30. A method for producing individually coded read patterns, said method comprising:
- producing a basic pattern comprised of a plurality of raised structures that are spaced apart with at least one group of patterns on a carrier substrate by means of a structuring apparatus; and
- forming at least one individually coded read pattern with read elements from a selected or selectable subset of a total set of patterns of each group, wherein one read pattern at a time is formed from each group and each read pattern is coded differently.

31. A device for producing at least one resonator for an RFID chip, said at least one resonator including an individually coded read pattern, said device comprising:
- a structuring apparatus for producing a basic pattern comprised of a plurality of raised structures that are spaced apart with at least one group of patterns on a carrier substrate; and
- a processing apparatus for forming from a subset of a total set of the patterns of each group at least one read pattern with read elements, each read pattern being individually coded and corresponding to one resonator for an RFID chip, said processing apparatus including:
  - a dispenser that dispenses a first material at predetermined locations along said plurality of raised structures, and
  - a coating means for applying a second material on said carrier substrate, said plurality of raised structures and said first material wherein said second material disposed directly on said carrier substrate at least partially defines at least one individually coded read pattern.

* * * * *